United States Patent
Nomura

[15] 3,704,822
[45] Dec. 5, 1972

[54] APPARATUS FOR FORMING T-WELDS BETWEEN MUTUALLY PERPENDICULAR PLATES

[72] Inventor: Hirokazu Nomura, Yokohama, Japan

[73] Assignee: Nippon Kokan Kabushiki Kaisha, Tokyo, Japan

[22] Filed: March 20, 1970

[21] Appl. No.: 21,392

[52] U.S. Cl. ............................228/25, 29/155, 29/200 P, 114/65, 219/125, 228/4, 228/45
[51] Int. Cl. ............................B23k 1/00, B23k 5/00
[58] Field of Search ......228/4, 5, 6, 44, 45; 219/124, 219/125; 29/200 J, 200 D, 438, 155; 269/61; 114/0.5, 65, 71

[56] References Cited

UNITED STATES PATENTS

| | | | |
|---|---|---|---|
| 2,164,567 | 7/1939 | Burke | 29/155 R |
| 2,288,796 | 7/1942 | Edwards | 29/200 J |
| 2,342,179 | 2/1944 | Ciesa et al. | 29/200 J |
| 2,366,961 | 1/1945 | Fine et al. | 29/200 J |
| 3,164,713 | 1/1965 | Banks et al. | 219/124 |

Primary Examiner—John F. Campbell
Assistant Examiner—R. J. Craig
Attorney—Steinberg and Blake (This application filed under rule 47(b))

[57] ABSTRACT

A welding apparatus for forming T-welds between a base plate and a plurality of reinforcing plates perpendicular thereto. Each of the latter reinforcing plates has an edge engaging a surface of the base plate to form a pair of corners therewith extending longitudinally of this edge, and a pair of fillet welds are simultaneously deposited in the pair of corners of each reinforcing plate so that in a single pass each reinforcing plate is T-welded to the base plate. For this purpose a pair of welding means are provided at each of the corners and a carriage means carries a pair of welding means for simultaneously transporting them longitudinally along the pair of corners to simultaneously deposit fillet welds in the latter, respectively.

6 Claims, 4 Drawing Figures

APPARATUS FOR FORMING T-WELDS BETWEEN MUTUALLY PERPENDICULAR PLATES

BACKGROUND OF THE INVENTION

The present invention relates to welding.

In particular, the present invention relates to the formation of T-welds between mutually perpendicular plates.

For example in the shipbuilding industry, structures such as hull frame components including hull longitudinals which extend longitudinally with respect to the main plates are commonly manufactured by welding reinforcing plates perpendicularly to the main plates. This is brought about forming T-welds which involve depositing fillet welds at the opposed corners defined between the edge of a reinforcing plate and the surface of a main plate which is engaged by the reinforcing plate.

Customarily, by hand or gravity welding, a fillet weld is deposited first along one corner and then along the other corner at the intersection between a reinforcing plate and a main plate. Structures of this type generally include a large series of reinforcing plates which may be parallel to each other, all projecting perpendicularly from and engaging a surface of a main plate, so that operations of the above type are exceedingly time consuming and expensive because of the tedious progression of the fillet weld deposition successively along the corners at the intersection between the plates.

SUMMARY OF THE INVENTION

It is accordingly a primary object of the present invention to provide an improvement of the above conditions.

In particular, it is an object of the invention to provide apparatus which will enable operations of the above type to be carried out far more rapidly than has heretofore been possible.

Furthermore, it is an object of the invention to provide apparatus which will enable the time required for the operations to be decreased without in any way detracting from the quality of the structure.

Also it is an object of the invention to provide an exceedingly simple rugged apparatus which can be very reliably operated in a convenient manner for carrying out the operations which form the method of the invention.

According to the invention a pair of fillets are simultaneously deposited along the corners defined between the edge of one plate and the surface of another plate which is engaged by this edge, so that simultaneous deposition of fillet welds to form a T-weld between a pair of mutually perpendicular plates is carried out with the method of the invention. The apparatus of the invention includes a pair of welding means respectively situated simultaneously at the corners which are to receive the fillet welds, and a carriage means is common to and carries both of the welding means for simultaneously transporting the latter along the corners for the simultaneous deposition of the fillet welds in these corners to bring about the T-weld connection between the mutually perpendicular plates.

BRIEF DESCRIPTION OF DRAWINGS

The invention is illustrated by way of example in the accompanying drawings which form part of this application and in which.

DESCRIPTION OF PREFERRED EMBODIMENTS

Figure 2:
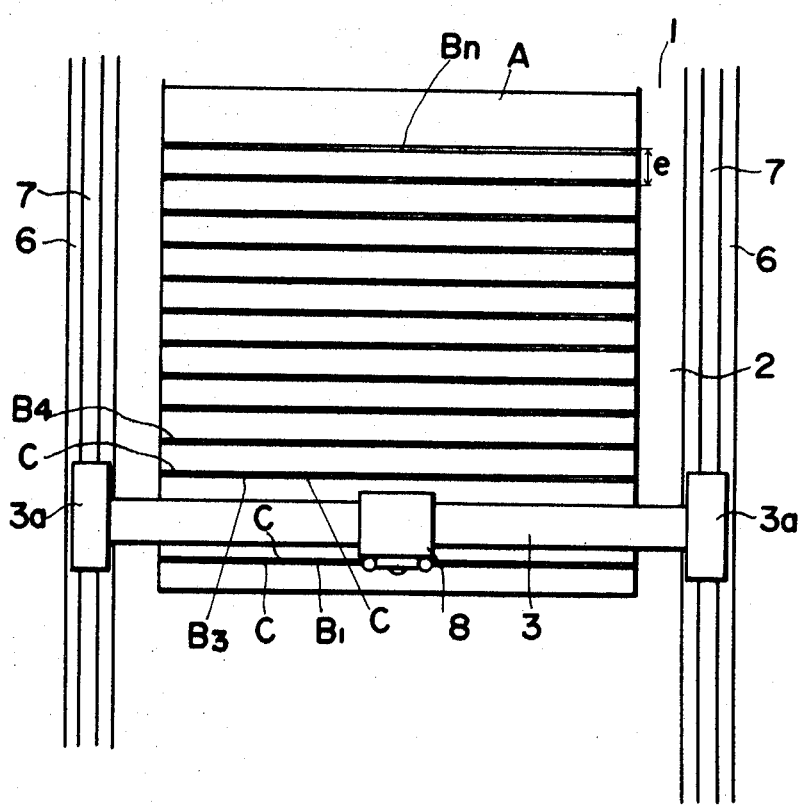
FIG. 2 is a schematic plan view illustrating how the series of reinforcing plates extend from the main plate and how the crane with the structure carried thereby is movable longitudinally of the main plate from one reinforcing plate to another.

Referring first to FIG. 2, it will be seen that a series of upright reinforcing plates $B_1$, $B_2$, $-B_n$ extend upwardly from a main plate A which is transported in any suitable way along a conveyor line 1 so as to become situated at the welding station which is illustrated in a schematic plan view in FIG. 2. The several upright reinforcing plates are spaced from each other by intervals $e$, which need not necessarily be the same interval for the several upright reinforcing plates. Before reaching the welding station shown in FIG. 2 the several reinforcing uprights are temporarily welded to the main base plate A as by being tack-welded thereto. Thus, after the preliminary tack welding which serves only to temporarily position the reinforcing plates with respect to the main plate, the work is transported along the conveyor 1 to the welding station 2 which is indicated in FIG. 2.

Figure 1:
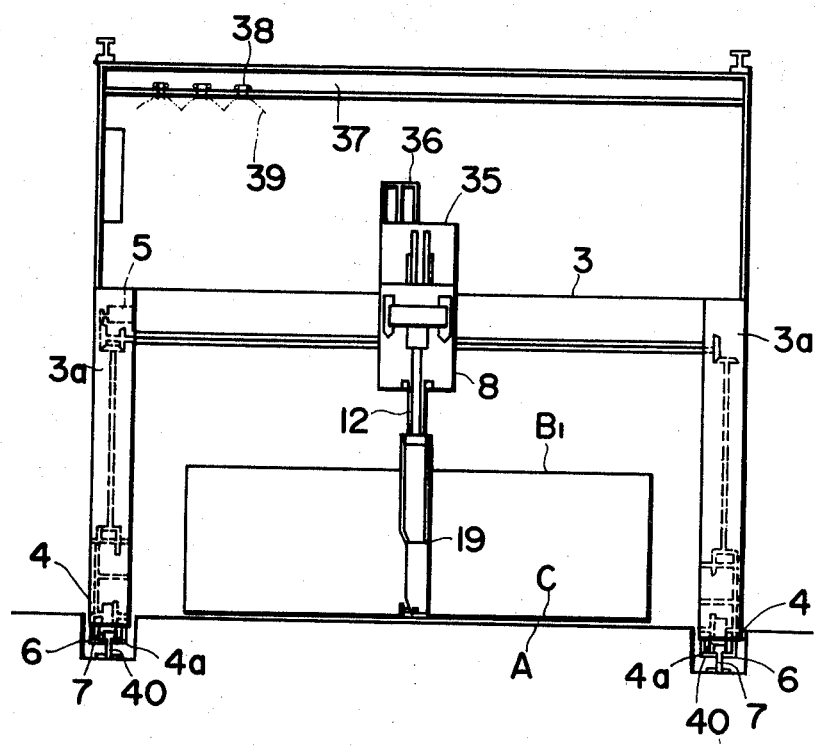
FIG. 1 is a schematic transverse elevation taken in a plane parallel to one of the upright plates which is to be welded to a horizontal main plate, FIG. 1 schematically showing the bridge crane and one of the welding means on one side of a reinforcing plate.

As is apparent from FIGS. 1 and 2, a bridge crane forms a crane means which is situated at the welding station, this bridge crane including the transverse beam 3 and the pair of uprights 3a which respectively carry the transverse beam at the opposed ends of the latter. Thus the transverse beam 3 of the bridge crane extends over the work parallel to the reinforcing plates, as is apparent from FIGS. 1 and 2.

For the pair of uprights 3a of the crane means are provided at their lower ends with wheel supports 4 respectively supporting wheels 4a for rotary movement, at least a pair of these wheels 4a being provided at each of the uprights 3a. The wheels 4a roll along the tracks 7 which are situated within the trenches 6 which are formed along the floor of the plant. In this way the crane means is guided for movement in the path of travel of the work as the latter is conveyed by the conveyor means. Thus the crane means can move longitudinally of the main plate A.

Figure 4:
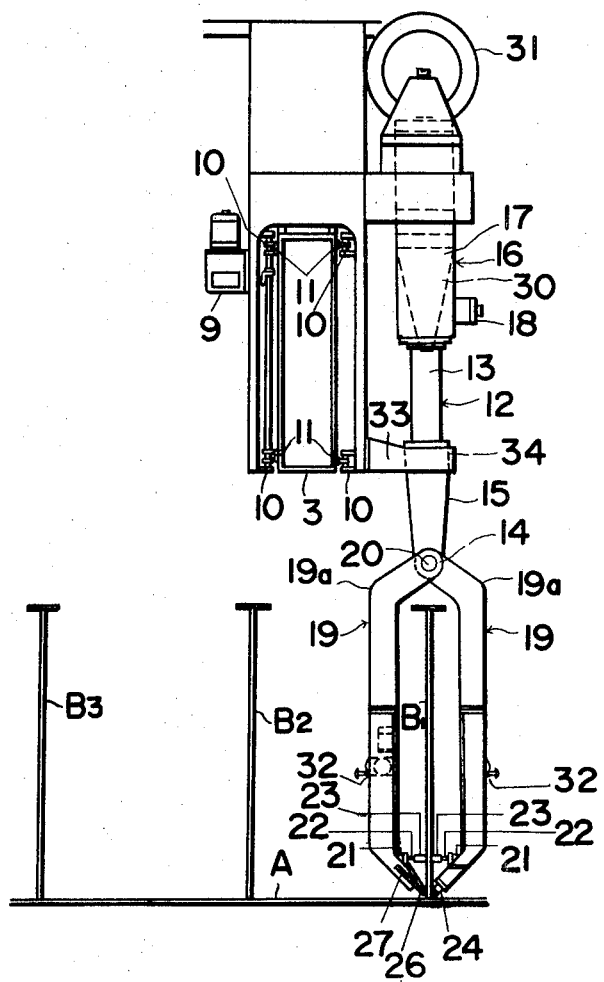
FIG. 4 is a fragmentary schematic longitudinal elevation, partly in section, showing more details of the apparatus of the invention, the plane of FIG. 4 being taken perpendicularly to the series of upright reinforcing plates, longitudinally of the main base plate.

A carriage means 8 is provided on the beam 3 to be supported by the latter for movement parallel to a reinforcing plate. This carriage means 8, the details of which are most clearly apparent from FIG. 4, is of a generally saddlegshaped configuration and extends around the beam 3 in the manner shown in FIG. 4. Thus the carriage means 8 is guided for movement perpendicularly to the longitudinal direction of the main plate A. For the purpose of moving the carriage means along the beam 3 the latter carries racks 11 engaged by pinions 10 driven by any suitable drive 9 carried by the carriage 8 at one side thereof and connected through any suitable transmission such as the bevel gear transmission as shown in FIG. 4 to the racks. In this way the drive 9 can be operated to move the carriage means 8 and all of the structure carried thereby in one direction or the other along the beam 3 of the bridge crane.

At the side of the carriage 8 opposite from the drive 9, this carriage 8 carries a connecting means which serves to connect a pair of welding means to the carriage means. This connecting means 12 includes a vertically extending shaft 13 carrying at its lower end a frame such as a clevis 15 which carries at its bottom end an elongated supporting pin 20 which extends parallel to the upright reinforcing plates. This supporting pin 20 forms a bearing 14 on which the pair of welding means 19 are swingably supported in a manner described below. In order to vertically move the connecting means 12 the carriage 8 fixedly carries an elongated tubular housing 16 receiving an upper cylindrical portion 17 of the shaft 13. A motor 18 is provided at the side of the housing 16 for regulating the elevation of the shaft 13. For this purpose the part 17 received in the housing 13 may be formed with teeth so as to form a rack, or it may carry a separate rack, meshing with a pinion driven by the motor 18, or the motor 18 may drive a worm which in turn rotates a nut which is threaded onto the cylindrical portion 17 with this nut restrained against vertical movement while the portion 17 and shaft 13 are restrained against rotary movement so that when the nut is turned the elevation of the shaft 13 will change.

The pair of welding means 19 are in the form of vertically extending frame structures having upper portions 19a inclined toward each other and terminating in eyes through which the pin 20 passes so that the pair of welding means 19 are freely swingable toward and away from each other. Because the centers of gravity of the pair of welding means 19 are displaced to the right and left from the vertical plane which includes the axis of the pin 20, as viewed in FIG. 4, the force of gravity acts on the pair of welding means 19 to provide moments urging them to swing toward each other at their lower ends. . Thus the lower ends of the pair of welding means 19 can be caused to approach each other to be located quite close to each other during the welding operations and at the same time the pair of welding means 19 are swingable apart from each other.

It will be noted that the lower end regions of the pair of welding means 19 are inclined inwardly toward each other, these lower end regions carrying the components which participate directly in the welding operations to form a pair of fillets simultaneously at both of the corners C such as those indicated in FIG. 2. As may be seen from the lower portion of FIG. 4, the pair of welding means 19 are provided at their lower end regions with the pressure-fluid cylinder and piston assemblies 21 which can be actuated for spreading the pair of welding means apart from each other as well as for freeing them to swing inwardly toward each other. These assemblies include pistons 22 carrying rollers 23 for directly engaging and rolling along the opposed side surfaces of each upright such as the upright $B_1$ shown at the right in FIG. 4. The pair of welding means 19 are urged to the welding positions by gravity through the above-described moments.

Each welding head 19 is formed at its lower loading end region with a stylus roller 24 (FIG. 3), and this roller is followed by a flux-spraying nozzle 25 which in turn is followed by the first electrode 26. This latter electrode is followed by the second electrode 27 and finally each welding means includes a trailing flux-retrieving pipe 28 having a lower open end for retrieving excess flux. During operations the pair of stylus rollers 24 are received in the pair of corners which are to simultaneously receive the fillet welds, and during the welding operations the leading rollers 24 progress along the corners while the flux is sprayed from the nozzles 25. The filler material is derived from the wire welding rods 29 which are melted by the electrodes 26 and 27.

The flux-spraying nozzle 25 and the retrieving tube 28 are respectively placed through suitable tubes in communication with a separation tank 30 receiving the excess flux from the retrieval tube 28 and recirculating the flux back to the supply nozzle 25 after separating of impurities therefrom. As is apparent from FIG. 3, in the illustrated example the carriage 8 carries a pair of the separating tanks 30 which are connected through unillustrated tubes with the spray nozzle 25 and retrieval tube 28.

The wire welding rod 29 is coiled on a pair of reels 31 carried by the upper part of the carriage 8 over the cylindrical portion 17 which is received in the housing 16. A pair of feeding devices 32 are carried by each of the welding means for feeding the rods 29 to the welding location to form the fillet welds.

The carriage 8 carries a horizontally projecting lower member 33 formed with an opening 34 through which the connecting means 15 extends so as to be vertically movable in this opening.

Figure 3:
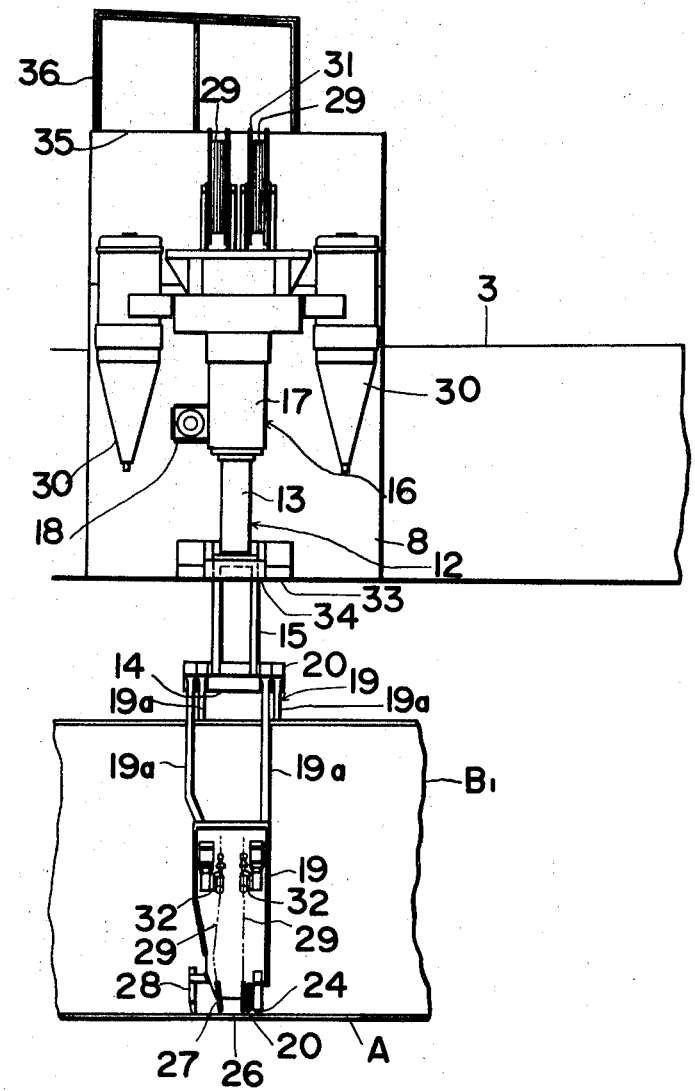
FIG. 3 is a fragmentary transverse elevation showing the central structure of FIG. 1 at an enlarged scale, as compared to FIG. 1 and in greater detail than in FIG. 1.

Moreover, at the upper part of the carriage 8 there is a stand 35 for the operator, and hand rails 36 for the operator are also provided, as indicated at the upper part of FIG. 3. Moreover, as is indicated at the upper part of FIG. 1, the bridge crane carries an upper framework provided with a rail 37 along which trolleys 38 are freely movable, these trolleys 38 carrying the power cables 39 from which the electrical power is delivered to the welding apparatus.

Finally, at each of the tracks 7 is a clamp 40 which may be actuated for tightly clamping the bridge crane to the tracks 7 when the crane has been precisely positioned at a desired location with respect to the work. When a pair of fillet welds have been deposited the clamp means 40 is released so that the crane can be moved to the next location where a pair of fillets are to be simultaneously deposited in a pair of corners.

Thus, with the apparatus of the invention the main base plate material A will have the series of reinforcing upright plates $B_1$, $B_2$ –$B_n$ temporarily tack welded thereto, and with the reinforcing plates thus temporarily fixed in position with respect to the main plate A, the structure is transported to the welding station 2. At this welding station the carriage means 8 has been located at one end of the beam 3, and the pair of welding means 19 simply hang from the pin 20 with the pair of rollers 23 engaging each other. The carriage means 8 is actuated to advance the pair of welding means 19 along a plate such as the plate $B_1$ shown in FIG. 4, and in this way the reinforcing plate becomes located between the pair of welding means. The rollers 23 simply move apart from each other to engage the opposite vertical surfaces of the plate $B_1$ as the carriage advances. The connecting means 12 can simply be raised or lowered, as required, by the action of the drive 18, in order to precisely position the stylus rollers 24 at the corners which are to simultaneously receive the fillet welds, and then the welding operations are automatically carried out as the pair of welding means are continuously advanced along the corners by the continuous driving of the carriage means 8 from the drive 9 along the beam 3. Because of the force of gravity acting on the pair of welding means 19 the work actually is clamped between the rollers 24. Thus both of the corners C at the opposite sides of a given reinforcing plate where its edge engages the main plate will simultaneously receive the fillet welds. In this way automatic welding simultaneously takes place at both of these corners so that in a single pass an entire reinforcing plate is directly welded to the main plate to form a T-weld therewith.

When the end of the single pass is reached, the feeding of the welding rod as well as the feeding of the sprayed flux is automatically terminated and this particular cycle of operations has been completed. At this time the fluid pressure cylinders 21 are actuated to swing the pair of welding means at the lower ends away from each other, and the rollers 23 simply engage each other at this time. Also the drive 18 is actuated to raise the assembly so that now it can be returned back to the starting position without any welding operations taking place and with the rollers 23 rolling along the opposed side surfaces of the welded plate $B_1$ at a higher elevation than these rollers had during the welding operations. When the carriage means 8 has in this way been returned to its starting position the entire welding means will have been located beyond the welded plate $B_1$, and now the entire bridge crane can be advanced along the tracks, after release of the clamp 40 at the bottom end of each upright 3a, so that the pair of welding means can now be situated in proper alignment with the next reinforcing upright, such as the upright $B_2$, to proceed in the above-described manner with the welding of the latter to the base plate. In this case the crane would simply be advanced along the tracks by the distance e between the pair of reinforcing plates $B_1$ and $B_2$. At this next plate $B_2$ the pair of welding means will be properly situated at the starting end of the pair of corners and well advance therealong simultaneously in the manner described above. A properly constructed electrical control circuit is provided for automatically carrying out the above welding operations.

Thus, with the structure of the invention the bridge crane straddles the work to move the carriage very conveniently along the work for situating the pair of welding means in alignment with the pair of corners which are to simultaneously receive the fillet welds. In this way the efficiency of the entire operation is very greatly improved. The pair of welding heads can be moved through any distance e provided from one upright to the next, and also the pair of welding heads are readily movable along the reinforcing plate to weld the latter to the main plate by movement of the carriage 8 along the beam 3. It is thus possible to achieve a very high quality fillet weld, with a pair of these welds being simultaneously deposited in a pair of corners without any particular restriction as to the types of materials which are welded or as to the length and thickness of the materials which are to be welded or in fact with respect to the distance between the upright reinforcing plates.

What is claimed is:

1. In a welding apparatus for forming a T-weld between a pair of mutually perpendicular plates with fillet welds situated in the corners formed by the engagement of an edge of one plate with a surface of the other plate, a pair of welding means respectively situated at the latter corners for welding the plates to each other with fillet welds respectively situated in said corners, carriage means carrying said pair of welding means for moving the latter simultaneously along the edge of the plate whose edge engages the surface of the other plate for progressively introducing the fillet weld into the corners simultaneously during simultaneous operation of the pair of welding means as they are moved by said carriage means, and support means carried by said carriage means and supporting said pair of welding means thereon, said pair of welding means respectively having lower ends situated at said corners, and said support means supporting said pair of welding means for free swinging movement inwardly toward and outwardly away from each other at said lower ends thereof, said pair of welding means respectively having centers of gravity which urge them to swing inwardly toward each other at their lower ends for locating the pair of welding means respectively at said corners.

2. The combination of claim 1 and wherein a bridge crane means carries said carriage means and has a transverse beam extending in the welding direction and supporting the carriage means for movement therealong.

3. The combination of claim 2 and including guide means for a series of plates respectively having edges situated at the surface of a base plate to form a series of T-welds therewith, said guide means coacting with said crane means for guiding the latter for movement transversely of the welded edges along the base plate for selectively situating the pair of welding means at opposite sides of a given plate whose edge engages the base plate to shift the apparatus from one pair of corners to another pair of corners to carry out the welding operations sequentially at the several plates whose edges engage the base plate.

4. The combination of claim 2, said support means including a supporting pin extending parallel to the corners which receive the fillet welds, said pair of welding means both being swingable on said supporting pin and extending downwardly therefrom to swing at their lower ends toward and away from each other into and away from the corners which are to receive the fillet welds, and a connecting frame carrying said supporting pin and connecting the latter with said carriage means.

5. The combination of claim 4 and wherein a means is operatively connected with said connecting frame for raising and lowering the latter with respect to said carriage means.

6. The combination of claim 5 and wherein a drive means is operatively connected with said carriage means for driving the latter along the transverse beam of said bridge crane means.

* * * * *